Jan. 25, 1944.  W. SCHLUMPF  2,339,884
MATERIAL WORKING APPARATUS
Filed Nov. 14, 1942  4 Sheets—Sheet 1
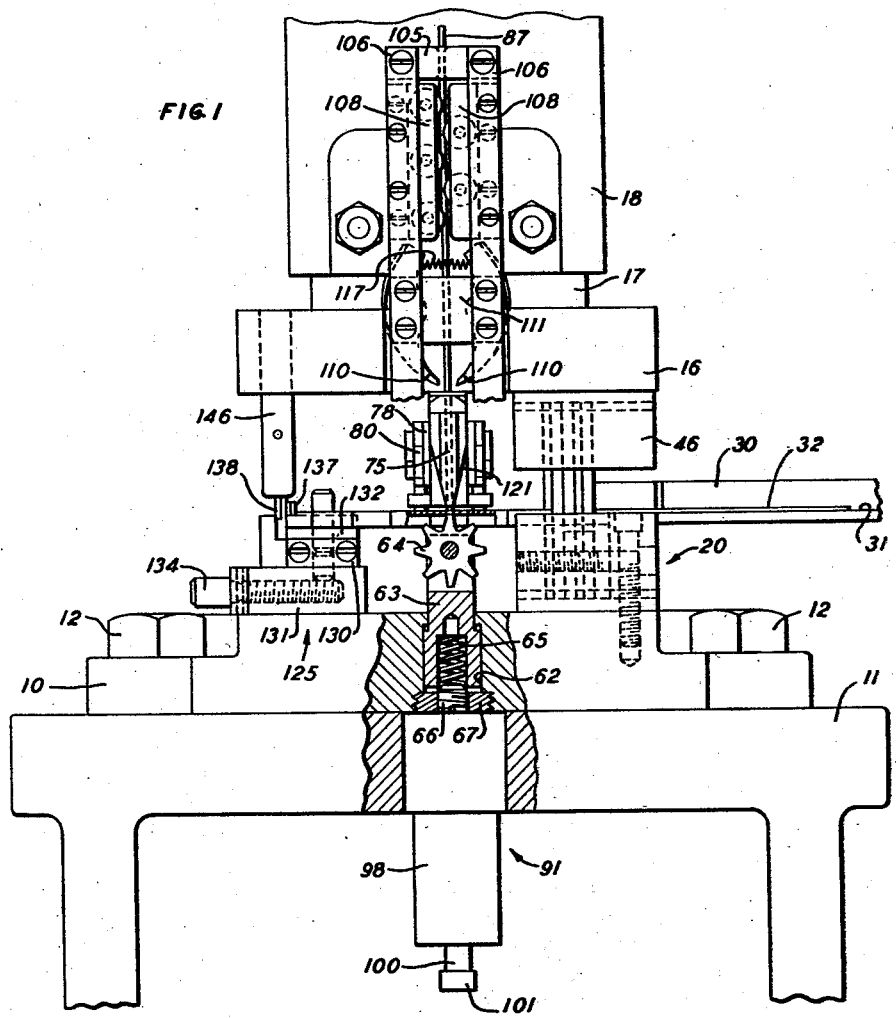
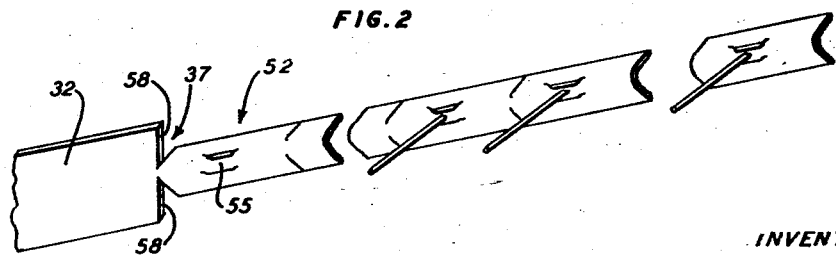
INVENTOR
W. SCHLUMPF
BY
E.R. Nowlan
ATTORNEY

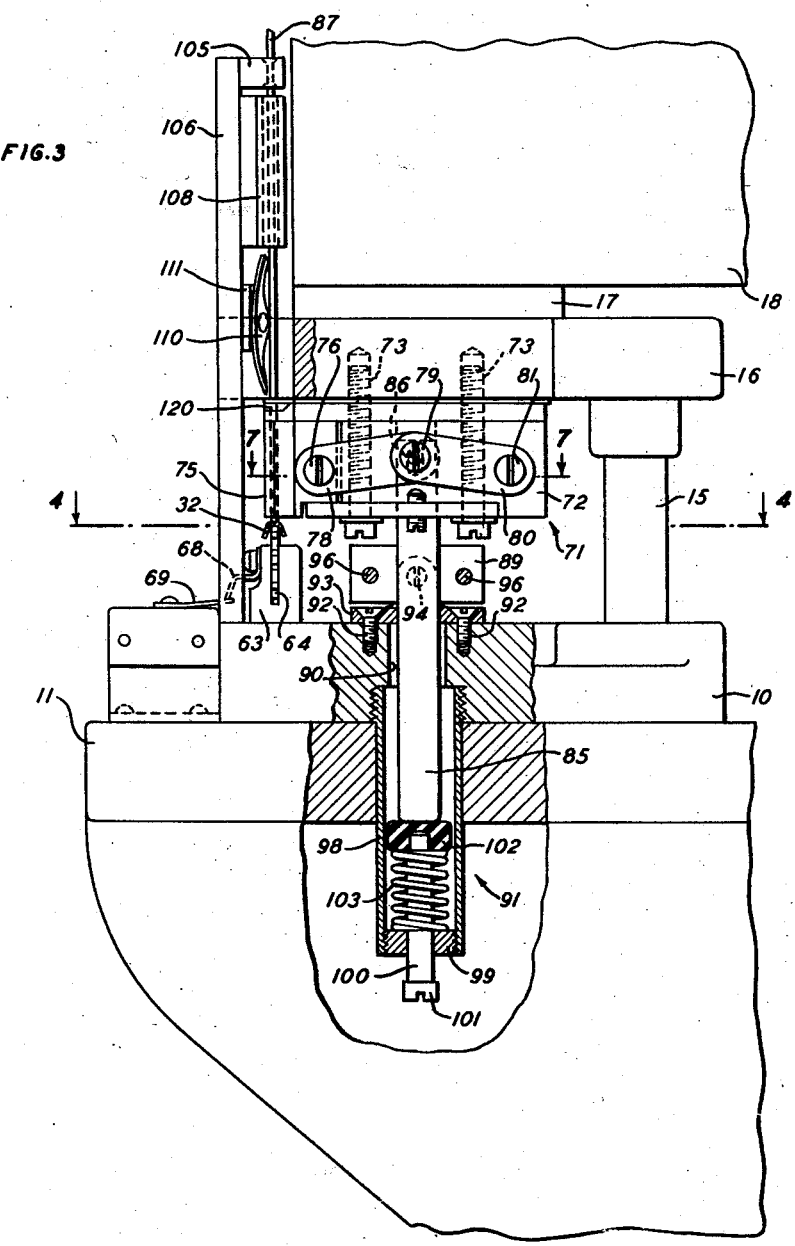

Jan. 25, 1944. W. SCHLUMPF 2,339,884
MATERIAL WORKING APPARATUS
Filed Nov. 14, 1942 4 Sheets-Sheet 3
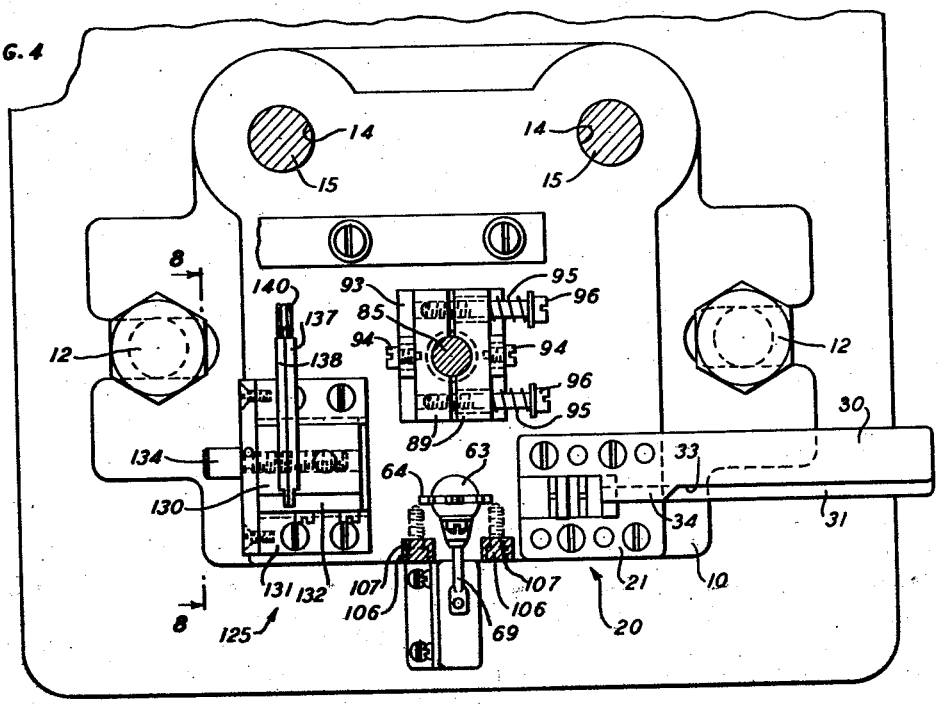
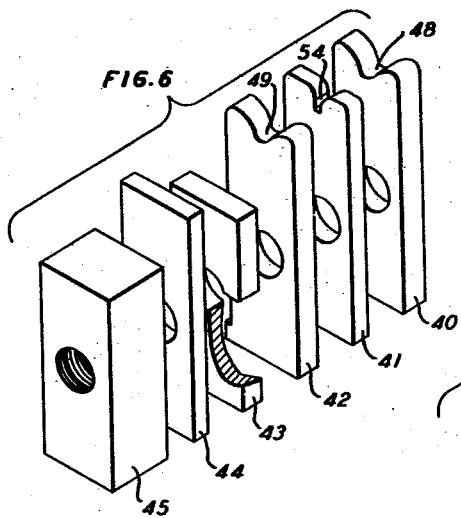
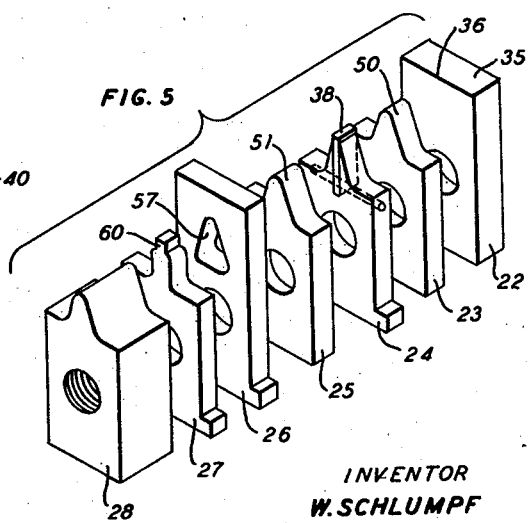
INVENTOR
W. SCHLUMPF
BY
E. R. Nowlan
ATTORNEY Jan. 25, 1944. W. SCHLUMPF 2,339,884
MATERIAL WORKING APPARATUS
Filed Nov. 14, 1942 4 Sheets-Sheet 4
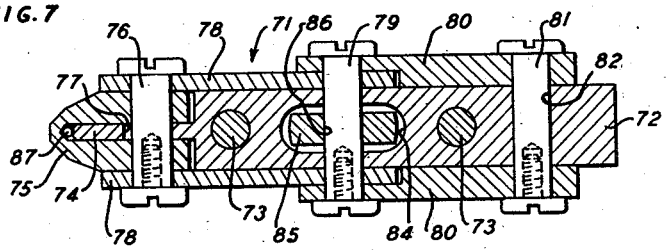
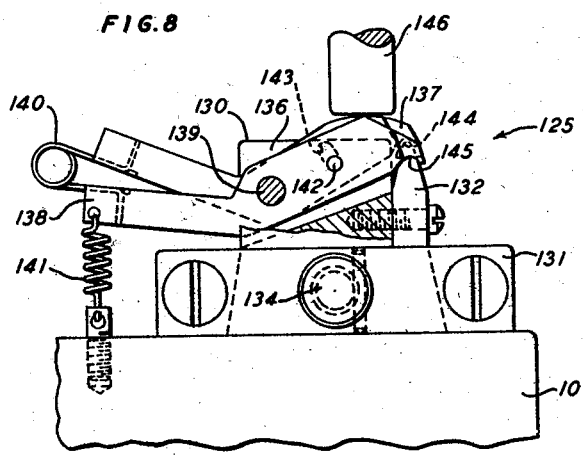
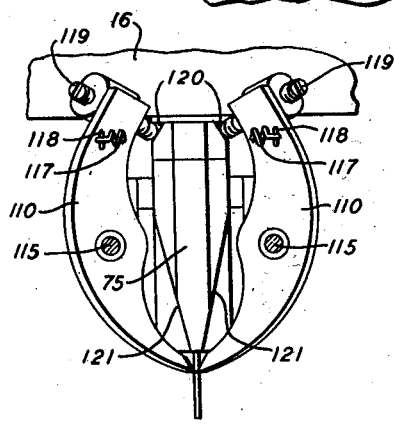
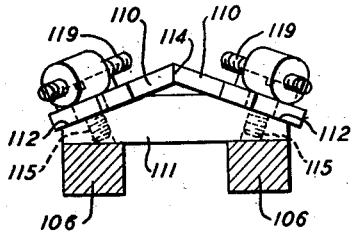
INVENTOR
W. SCHLUMPF
BY
E. R. Nowlan
ATTORNEY Patented Jan. 25, 1944

2,339,884

UNITED STATES PATENT OFFICE 2,339,884

MATERIAL WORKING APPARATUS

Walter Schlumpf, Fanwood, N. J., assignor to Western Electric Company, Incorporated, New York, N. Y., a corporation of New York Application November 14, 1942, Serial No. 465,584

20 Claims. (Cl. 219—4)

This invention relates to material working apparatus, and more particularly to apparatus for forming parts and welding them together.

An object of the invention is to provide a material working apparatus, and more particularly a simple, efficient and highly practical apparatus for forming parts and welding them together.

With this and other objects in view, the invention comprises mechanism to form like parts successively from a supply of material, welding another part thereto, and subsequently severing the parts from each other.

Other objects and advantages will be apparent from the following detailed description when considered in conjunction with the accompanying drawings, wherein Fig. 1 is a front elevational view of the apparatus, portions thereof being broken away;

Fig. 2 is a perspective view of the product of the apparatus illustrating the results of different operations thereof;

Fig. 3 is a fragmentary side elevational view of the apparatus, portions thereof being shown in section;

Fig. 4 is a horizontal sectional view of the lower portion of the apparatus, this view being taken substantially along the line 4—4 of Fig. 3;

Fig. 5 is an exploded view of the lower set of die members used in forming certain of the parts;

Fig. 6 is an exploded view of the upper set of die members which cooperate with those shown in Fig. 5;

Fig. 7 is a sectional detail view of a material feeding unit, this view being taken along the line 7—7 of Fig. 3;

Fig. 8 is an enlarged fragmentary detail view of the holding and final shearing unit, this view being taken along the line 8—8 of Fig. 4;

Fig. 9 is an enlarged fragmentary view of the wire shearing mechanism, and

Fig. 10 is a top plan view of the structure shown in Fig. 9.

Referring now to the drawings, attention is first directed to Figs. 1, 3 and 4. The apparatus includes a base 10 mounted upon a suitable support 11 through the aid of screws 12 and including apertures 14 to slidably receive centering posts 15 of a head 16. The head 16 is mounted upon a reciprocable member 17 mounted for movement in a support 18 and adapted to move through repeated single cycles through the aid of a mechanism not shown. In the present instance this mechanism is similar to the operating head of a punch press controlled through a one-revolution clutch operated by a treadle. It is not believed necessary to show any details of this mechanism, as such is commonly known, it being understood, however, that the head 16 with its associated mechanism may at will be moved through an operating cycle.

Referring now to the base 10, a material forming unit, indicated generally at 20, includes a die holder 21 in which a plurality of dies 22, 23, 24, 25, 26, 27 and 28 is mounted. These dies are shown in exploded or separated positions in Fig. 5, it being understood, however, that they are assembled in this order but closely positioned in the die holder 21. A material guide 30 is mounted upon the die holder 21 and has a shelf 31 upon which material 32 (Fig. 1) may be advanced in a guided path to the dies. Prior to the time the material reaches the dies, the material is guided on three sides, one by the shelf 31, one by a vertical wall 33 adjacent the shelf, and the third by an overhanging portion 34, completing a groove through which the material is advanced. Returning again to the dies shown in Fig. 5, the die 22 is rectangular in general contour and has its upper surface 35 disposed in or adjacent the plane of the shelf 31 for the movement of the material over this surface. An edge 36 of this die may be called the shearing edge, for the reason that the material at this position will be partially sheared as indicated at 37 in Fig. 2. The dies 23, 24 and 25 have their particular upper form, the dies 23 and 25 being identical while the die 24 has an added piercing element 38 mounted at the center thereof and projecting a given distance above the upper extremities of its associated dies. At this time attention is directed to the upper set of punches illustrated in Fig. 6, these punches bearing reference numerals 40, 41, 42, 43, 44 and 45. The punches 40 to 45 inclusive are mounted in a punch holder 46 carried by the head 16 and positioned directly above their respective dies 23 to 28 inclusive. The punches 40 and 42 have concaved portions 48 and 49 respectively which conform somewhat to the upper forming portions 50 and 51 of the dies 23 and 25, to cause forming of a length of the material 32 into the form indicated at 52 (Fig. 2). The punch 40 cooperates with the die 22 in bringing about the partial shearing operation indicated at 37 (Fig. 2). The punch 41 has a contour 54 in its lower surface (this being the upper surface, Fig. 6) which cooperates with the element 38 and the associated die portions of the die 24, to assist in the forming of the material and to partially pierce a central portion 55 upwardly in the material at this position. After the portion 52 of the material has been thus formed during one cycle of operation of the apparatus, during the next rest period of the apparatus the material may be advanced a given distance to move the portion 52 through an aperture 57 in the die 26, this aperture being triangular in general contour and conforming to the portion yet sufficiently large for the movement of this portion therethrough. However, the forward edges of the remaining portion of the material, these edges being indicated at 58 (Fig. 2), will engage the nearest side of the die 26 to control the advancement of the material a measured distance. The die 26 may thus readily be called a control element, as it controls the advancement of the material measured distances after each cycle of operation. The punch 43 may thus readily be called a spacing member, as it does not function as a punch but is aligned with the control member 26 to accurately space the associated punch members 42 and 44. During the next cycle of operation another length of the material 32 is given the form as indicated at 52 (Fig. 2), including the portion 55, while the first formed portion projects through the aperture 57 and extends over the die 27 and partially over the die 28. Attention is at this time directed to the contour of the die 27, this die having a reduced portion 60 of the contour shown functioning with the punch 44, to cause operation upon the portion 55 formed during the previous operation to assure flattening of this portion, particularly the main central area thereof, the purpose of this being to assure accurate welding of the part to a wire hereinafter described. The die 28 and punch 45 assist in holding the part during this operation. Thus during each cycle of operation one length of the material is formed at 52 and 55, while a similarly formed length of material receives its final forming operation through the aid of the dies 27 and 28. After leaving the dies, the completed parts remaining integral with each other adjacent their upper portions yet partially separated through the original shearing operation, are advanced singly to a welding unit.

Attention is first directed to the lower electrode unit illustrated in Figs. 1, 3 and 4. The base 10 is apertured, at 62, to movably receive an electrode mounting 63 which supports an electrode 64. The electrode 64 in the present instance is of the star type, it being understood that this electrode may be of the disc type or of other types if so desired. The mounting 63 is centrally apertured to receive a spring 65 which normally urges the mounting and its electrode upwardly a limited distance and whose force may be varied through the aid of an adjusting screw 66, the latter being supported by a threaded element 67 positioned to close an aperture 62.

Attention at this time is directed to Figs. 3 and 4, which illustrate the mounting 63 as supporting a switch actuating arm 68 and movable therewith. The switch arm 68 is positioned to actuate a switch 69 when the mounting 63 reaches the end of its downward movement, this occurring during the welding operation as hereinafter described. The switch 69 causes closing and opening of an electrical welding circuit (not shown) and is mounted upon the support 11.

Attention is now directed to the wire feeding mechanism, which includes a gripping unit, indicated generally at 71, having a member 72 secured to the head 16 through the aid of screws 73. The member 72 has a reduced portion 74 which is straddled by a U-shaped member 75 (Fig. 7). The member 75 is supported by a pivot pin 76 which extends through the legs of the member and through an elongate aperture 77 in the portion 74. The pivot pin 76 also supports the forward end of links 78, the other ends thereof being supported by a pivot pin 79. Other links 80 have their forward ends pivotally mounted upon the pin 79 and their opposite ends pivotally supported by a pivot pin 81, the latter extending through an aperture 82 in the member 72.

Returning now to the pivot pin 79, it will be observed that this pin also extends through an aperture in the member 72, a vertical aperture 84 being provided in the member to freely receive an actuating rod 85. The aperture for the pivot pin 79 in the member 72 is elongated, as at 86 (Fig. 3), to permit vertical movement of the pivot pin to impart movement to the central ends of the links 78 and 80. Through this movement it will be apparent that the member 75 will be moved relative to the portion 74 to move the former into and out of gripping position relative to the latter, to grip at selected intervals a supply of material such as wire 87.

The actuating rod 85 (Figs. 3 and 4) extends downwardly between friction blocks 89 through an aperture 90 in the base 10 and into a control unit indicated generally at 91. Referring to the friction blocks 89, it will be apparent that these blocks are mounted in a bracket 93 through the aid of screws 94 mounted in insulating bushings, the bracket being secured to the base 10 as at 92 (Fig. 3), the screws 94 projecting into apertures in the blocks to hold the blocks against vertical movement relative thereto but to permit movement of the blocks toward and away from each other. These friction blocks are formed of any suitable bearing material and have concaved recesses in their inner faces to partially surround the actuating rod 85, attempting to retard the movement of the rod in either direction. The blocks are forced toward each other and into intimate engagement with the actuating rod through the aid of springs 95, the forces of which may be varied through the adjustment of screws 96 which support them. Thus the function of the friction blocks is to attempt to hold the actuating rod against movement to bring about actuation of the gripping unit 71, as will be hereinafter described.

The control unit 91 includes a tubular casing 98 which is threadedly connected to the base 10 in an aperture therein, to receive the lower end of the actuating rod 85. The lower end of the casing 98 is closed by the aid of a screw plug 99 which is centrally apertured to movably receive a screw 100, a head 101 of which is adapted to abut against the lower surface of the plug 99 to limit its upward movement. A pressure pad 102, mounted upon the inner end of the screw 100 and formed of suitable insulating material, is normally urged upwardly through the aid of a spring 103, the force of which is sufficient to move the actuating rod 85 relative to the gripping blocks 89.

The material or wire 87 is fed from a supply (not shown) through a guide 105 which is supported at its upper ends by uprights 106, the latter extending downwardly in parallel spaced positions to points where their lower ends are disposed in recesses 107 in the base 10 and secured in place through the aid of screws. The uprights 106 also support sets 108 of straightening rolls, between which the wire 87 is drawn during its advancement. Beneath the sets of straightening rolls 108, and supported by the uprights 106, is a set of shearing blades 110. For details of the shearing blades 110, attention is directed to Figs. 9 and 10. In Fig. 10 it will be observed that a cross member 111, supported by the uprights 106, has surfaces 112 which extend at like angles and adjacent to which shearing blades 110 are pivotally mounted at similar angles. The general contours of the shearing blades are arcuate, the shearing edges, however, at the lower extremities thereof indicated by the meeting line 114 (Fig. 10), lying in parallel planes to perform an accurate shearing operation upon the wire. Pivotal supports 115 for the shearing blades 110 are adjacent the center of the latter, the blades being normally urged in directions to move the shearing edges away from each other through the aid of a common spring 117, the ends of which are connected, as at 118, to each of the shearing blades adjacent the upper ends thereof. The means to actuate the shearing blades in the opposite directions to bring about the shearing operation of the wire, includes adjustable screws 119 carried by the upper ends of the shearing blades and adapted to engage cam-like surfaces 120 of the member 75 when the gripping unit 71 reaches its upper or starting position. It will be apparent, by viewing Fig. 9, that the member 75 has reduced sides 121 providing a V-shaped lower portion to enable free actuation of the shearing blades 110. Furthermore, the member 75 is so constructed that it will move freely between the shearing blades and will cause actuation thereof as it reaches the upper position.

Attention is now directed to unit 125, the purpose of which is to complete the shearing of the formed articles and to hold the next adjacent article against displacement during the final shearing operation. Referring to Figs. 4 and 8, this unit includes a support 130 having a dovetail connection with a mounting member 131, the latter being mounted upon the base 10. The support 130 includes a member 132 having a contour similar to the completed article and positioned to receive the foremost articles during their intermittent advancement. The member 132 is positioned so that its forward end (the extreme left end, Fig. 4) will lie at the juncture of the articles at the completion of their advancement. The member 132 as well as its supporting member 130 may be adjusted through the aid of an adjusting screw 134, to bring about the desired adjustment of this member with respect to the die 20 and punch holder 46. The member 130 is slotted, as at 136, to receive a holding member 137 and a shearing element 138. Both the element and member are mounted upon a common pivot 139 and are normally urged for rotation in opposite directions through the aid of a connecting spring 140, this spring being mounted, as shown in Fig. 8, at the ends of the projecting arms of the member and element. Another spring 141 normally urges the shearing element 138 counterclockwise or into its normal position. Another connection is provided between the holding member and the shearing element, this including a pin 142 carried by the element and extending into an elongate aperture 143 of the member.

Attention is now directed to the forward ends of the holding member and shearing element. These ends are similar in contour, they being concaved at 144 and 145 respectively, the former, however, serving to rest upon the second article and hold it in place upon the member 132 while the curved edge of the shearing element, in cooperating with the forward edge of the member 132, engages the adjacent portion of the first article and completes the shearing of this article from the second article. This actuation is brought about through the aid of a plunger 146 mounted in the head 16 as shown in Fig. 1 and movable therewith. Thus during each cycle of operation, the apparatus at the intervals when the articles 52 and the materials 32 forming the articles are at rest, the plunger 146 engages first the shearing element 138 and moves it downwardly or clockwise about its pivot 139. Through the force of the spring 140, this clockwise movement of the shearing element 138 will move the holding member 137 clockwise into its holding position. Therefore, the holding member is brought into position prior to the shearing operation, the spring 141 returning the holding member and shearing element to their starting position during the upward movement of the plunger 146.

Considering now the operation of the apparatus, let it be understood that the head 16 and its associated structures are reciprocated intermittently and during this reciprocal movement the material 32 is advanced at the open intervals of the apparatus. Furthermore, the reciprocal movement causes actuation of the unit 71, to first grip the wire 87, this being brought about through the function of the friction blocks 89 holding the actuating rod 85 against movement momentarily until the links 78 and 80 are moved to their extreme distances to cause the member 75 to be drawn inwardly to function with the portion 74 in gripping the wire. Thus at the beginning of the downward movement of the head 16 and the unit 71, the wire 87 is first gripped, then moved downwardly its extreme distance, a small length of the wire as will be observed by viewing Fig. 3, extending beneath the unit 71 to engage the portion 55 of the article 52, which at that moment is positioned above the electrode 64. This downward movement continues sufficiently to compress the spring 65 in the electrode unit (Fig. 1) and to cause actuation of the switch 69 to effect closing of the welding circuit which may also include the member 75 as an upper electrode. During this downward movement of the head and its associated unit 71, the spring 103 is compressed through the engagement of the actuating rod 85 with the pressure pad 102 and the force of the spring adds to the function of the friction blocks to increase the gripping engagement of the unit 71 with the wire 87. Another function of the spring 103 is to cause upward movement of the actuating rod 85 a given distance measured by the distance of the head 101 from the nut 99, this distance being sufficient to move the welded articles including the article 52 and the wire welded thereto upwardly, to allow the electrode unit or mounting 63 to return to its normal position. Thus the welded parts or articles are held in engagement with the electrode and moved therewith while the wire is being gripped by the unit 71 until the opening of the welding circuit is assured. The return of the unit or mounting 63 to its uppermost position effects opening of the switch 69. The moment the spring 103 ceases to function in moving the actuating rod 85, the friction blocks 89 effect stopping movement of the actuating rod and through this action the links 78 and 80 are moved to their aligned positions to move the member 75 outwardly and release the gripping connection with the wire. The unit 71 may then move upwardly free of the wire, the wire being held against upward movement by the sets of straightening rolls 108. During the continued upward movement of the unit 71 with the head 16, the member 75 passes between the shearing elements 110 which are normally held outwardly by the spring 117. However, at the completion of the upward movement of the unit 71, the cam portions 120 are put into effect through their association with the screws 119 to move the shearing blades into the shearing position shown in Figs. 9 and 10, to shear the welded portion of the wire at this point. The welded portion of the wire and its article 52 form a complete structure which remains connected through the integral portions to next adjacent article 52 to the right (Fig. 2) and the previously completed structures at the left until it receives the final shearing operations at the unit 125.

It being understood that during each cycle of operation of the apparatus the articles 52 are formed at the die and punch units 20 and 46 and are partially sheared at these units, the measurement of the articles is also controlled at these units through the aid of the member 26 (Fig. 5). The intermittent advancement of the articles formed by these units accurately locates the portions 55 at the electrode 64, so that during the operation of the apparatus the material or wire 87 will have its forward end welded to the flat surface of the portion 55 of this article, after which a given length of the material will be severed and the welded parts allowed to continue to the unit 125, where they will be separated one from the other.

Although specific improvements of the invention have been shown and described, it will be understood that they are but illustrative and that various modifications may be made therein without departing from the scope and spirit of this invention as defined by the appended claims.

What is claimed is:

1. A material working machine comprising a forming unit adapted to successively form articles from material, means adapted for the successive advancement of the material to the unit, means to feed parts to the articles, and means to cause welding of the parts to their respective articles.

2. A material working machine comprising a forming unit adapted to successively form articles from a supply of material and partially shear the articles therefrom, means adapted for the successive advancement of the material to the unit, means to feed parts to the articles, means to cause welding of the parts to their respective articles, and means to complete the shearing of the articles.

3. A material working machine comprising an electrode, means for the feeding of an article to the electrode, a material feeding unit actuable to grip a material short of the leading end thereof, means to move the unit to position the end of the material in engagement with the article, means including the electrode to cause welding of the article and the material, the said unit moving means being adapted to move the unit away from the electrode, and means to cause the unit to retain gripping connection with the material until the article is moved free of the electrode.

4. A material working machine comprising an electrode, means for the feeding of an article to the electrode, a material feeding unit actuable to grip a material short of the leading end thereof, means to move the unit to position the end of the material in engagement with the article, means including the electrode to cause welding of the article and the material, and means actuable by the gripping unit to sever a given length from the material at the welded end thereof.

5. A material working machine comprising a movable electrode, means for the feeding of an article to the electrode, a material feeding unit actuable to grip a supply of material short of the leading end thereof, means to move the unit to position the end of the material in engagement with the article and move the electrode with the article, and means actuable by the movement of the electrode to cause welding of the said end of the material to the article.

6. A material working machine comprising a movable electrode, means for the feeding of an article to the electrode, a material feeding unit actuable to grip a supply of material short of the leading end thereof, means to move the unit to position the end of the material in engagement with the article and move the electrode with the article, means actuable by the movement of the electrode to cause welding of the said end of the material to the article, the said unit moving means being adapted to move the unit away from the electrode, and means to cause the unit to retain gripping connection with the material until the electrode has returned to its original position and the article is moved free of the electrode.

7. A material working machine comprising a unit actuable to successively form articles from a supply of material and partially shear the articles therefrom, means adapted for the successive advancement of the material to the unit and the connected articles to a welding position, means to feed parts to their respective articles at the welding position, and means to cause welding of the respective parts and articles at the said position.

8. A material working machine comprising a unit actuable to successively form articles from a supply of material and partially shear the articles therefrom, means adapted for the successive advancement of the material to the unit and the connected articles to a welding position, means to feed parts to their respective articles at the welding position, means to cause welding of the respective parts and articles at the said position, and means to complete the severing of the articles after the welding of their parts thereto.

9. A material working machine comprising a unit actuable to successively form articles from a supply of material and partially shear the articles therefrom, means adapted for the successive advancement of the material to the unit and the connected articles to a welding position, means to feed parts to their respective articles at the welding position, means to cause welding of the respective parts and articles at the said position, means to complete the severing of the articles after the welding of their parts thereto, and means to grippingly support the adjacent subsequent articles during the final severing of each article.

10. A material working machine comprising means adapted for intermittent advancement of a supply of material, means actuable to partially shear portions from the material and form articles retained integral with each other and the said supply intermediate the advancements of the latter, means to feed parts to their respective articles, and means to cause welding of the respective parts and articles.

11. A material working machine comprising means adapted for intermittent advancement of a supply of material, means actuable to partially shear portions from the material and form articles retained integral with each other and the said supply intermediate the advancements of the latter, means to feed parts to their respective articles, means to cause welding of the respective parts and articles, and means to complete the severing of the leading article from its adjacent article.

12. A material working machine comprising means adapted for intermittent advancement of a supply of material, means actuable to partially shear portions from the material and form articles retained integral with each other and the said supply intermediate the advancements of the latter, means to feed parts to their respective articles, means to cause welding of the respective parts and articles, a holding element, a shearing element, and means to actuate the elements to cause them to respectively hold the next to the leading article and sever the leading article.

13. A material working machine comprising means adapted for intermittent advancement of a supply of material, means actuable to partially shear portions from the material and form articles retained integral with each other and the said supply intermediate the advancements of the latter, means to feed parts to their respective articles, means to cause welding of the respective parts and articles, a support for the next to the leading article, and means cooperating with the support to complete the severing of the leading article from the supported article.

14. A material working machine comprising means adapted for intermittent advancement of a supply of material, means actuable to partially shear portions from the material and form articles retained integral with each other and the said supply intermediate the advancements of the latter, means to feed parts to their respective articles, means to cause welding of the respective parts and articles, a support for the next to the leading article, a holding element, a shearing element, and means to actuate the elements relative to the support to cause them to respectively hold the next to the leading article on the support and to complete the severing of the leading article from the held article.

15. A material working machine comprising means adapted for intermittent advancement of a supply of material, means actuable to partially shear portions from the material and form articles retained integral with each other and the said supply intermediate the advancements of the latter, an element adapted to stop the material after a given length for each article has been advanced, apertured for the advancement of each article after it has been formed, means to feed parts to their respective articles, and means to cause welding of the respective parts and articles.

16. A material working machine comprising means adapted for intermittent advancement of a supply of material, means to bend a given length of the material into a substantially V-shaped article and simultaneously shear the leg portions of the article from the material intermediate the advancements of the latter, means to feed parts to their respective articles, and means to cause welding of the respective parts and articles.

17. A material working machine comprising means adapted for intermittent advancement of a supply of material, means to bend a given length of the material into a substantially V-shaped article and simultaneously shear the leg portions of the article from the material intermediate the advancements of the latter, means to flatten a surface of the central portion of each article, means to feed parts to the flattened surfaces of their respective articles, and means to cause welding of the respective parts and articles.

18. A material working machine comprising an electrode, means for feeding an article to the electrode, a material feeding unit actuable to grip a material short of the leading end thereof, means to move the unit between a normal position and a welding position to position the end of the material in engagement with the article, means including the electrode to cause welding of the article and the material, and cutting elements actuable by the unit when the unit is moved into its normal position to sever a given length of the material from the welded end.

19. A material working machine comprising an electrode, means for feeding an article to the electrode, a material feeding unit actuable to grip a material short of the leading end thereof, means to move the unit between a normal position and a welding position to position the end of the material in engagement with the article, means to actuate the unit to cause it to grip the material during movement toward the welding position and to free the material during its movement toward the normal position, means including the electrode to cause welding of the article and the material, and cutting elements actuable by the unit when the unit is moved into its normal position to sever a given length of the material from the welded end.

20. A material working machine comprising an electrode, means for feeding an article to the electrode, a material feeding unit actuable to grip a material short of the leading end thereof, means to move the unit between a normal position and a welding position to position the end of the material in engagement with the article, means to actuate the unit to cause it to grip the material during movement toward the welding position and to free the material during its movement toward the normal position, means including the electrode to cause welding of the article and the material, cutting elements actuable by the unit when the unit is moved into its normal position to sever a given length of the material from the welded end, and means to maintain the gripping unit in gripping relation with the material during a portion of its movement toward the normal position to cause the welded material to move the article free of the electrode.

WALTER SCHLUMPF.